United States Patent
Yanase

[11] Patent Number: 6,076,035
[45] Date of Patent: *Jun. 13, 2000

[54] WEAR CONDITION DETECTING APPARATUS FOR TIRE AND METHOD THEREOF

[75] Inventor: Minao Yanase, Kobe, Japan

[73] Assignees: Sumitomo Rubber Industries, Ltd., Hyogo-ken; Sumitomo Electric Industries, Ltd., Osaka-fu, both of Japan

[*] Notice: This patent is subject to a terminal disclaimer.

[21] Appl. No.: 09/108,388

[22] Filed: Jul. 1, 1998

[30] Foreign Application Priority Data

Jul. 10, 1997  [JP]  Japan ................................. 9-185552
Jun. 9, 1998  [JP]  Japan ................................. 10-160781

[51] Int. Cl.$^7$ ................................................ B60C 25/00
[52] U.S. Cl. ............................................... 701/80; 73/146
[58] Field of Search .................. 73/146, 146.2, 73/146.3; 701/80; 340/444

[56] References Cited

U.S. PATENT DOCUMENTS 5,065,618 11/1991 Hodges, Sr. et al. ...................... 73/146
5,513,523 5/1996 Sekiya et al. ............................... 73/146
5,591,906 1/1997 Okawa et al. ........................... 73/146.5
5,670,716 9/1997 Tamasho et al. ....................... 73/146.2
5,721,374 2/1998 Siekkinen et al. ...................... 73/146.2
5,771,480 6/1998 Yanase ....................................... 701/80

*Primary Examiner*—Max Noori
*Attorney, Agent, or Firm*—Birch, Stewart, Kolasch & Birch, LLP

[57] ABSTRACT

A wear condition detecting apparatus for a tire comprising: (a) a rotational speed detecting means for regularly detecting rotational speeds of tires of four wheels presently attached to a vehicle, (b) a calculating means for calculating a ratio of a rotational speed of a front wheel to a rotational speed of a rear wheel based on a measured value obtained by the rotational speed detecting means, and for obtaining a relational formula between the rotational speed ratio and an acceleration of the vehicle, and (c) a comparing means for comparing a slope of the relational formula obtained by the calculating means with a preliminarily known slope of a relational formula between a rotational speed ratio of a tire and an acceleration of the vehicle. According to the present invention, the wear condition of a tire can be known, so that the performance and safety of a vehicle can be improved.

8 Claims, 8 Drawing Sheets

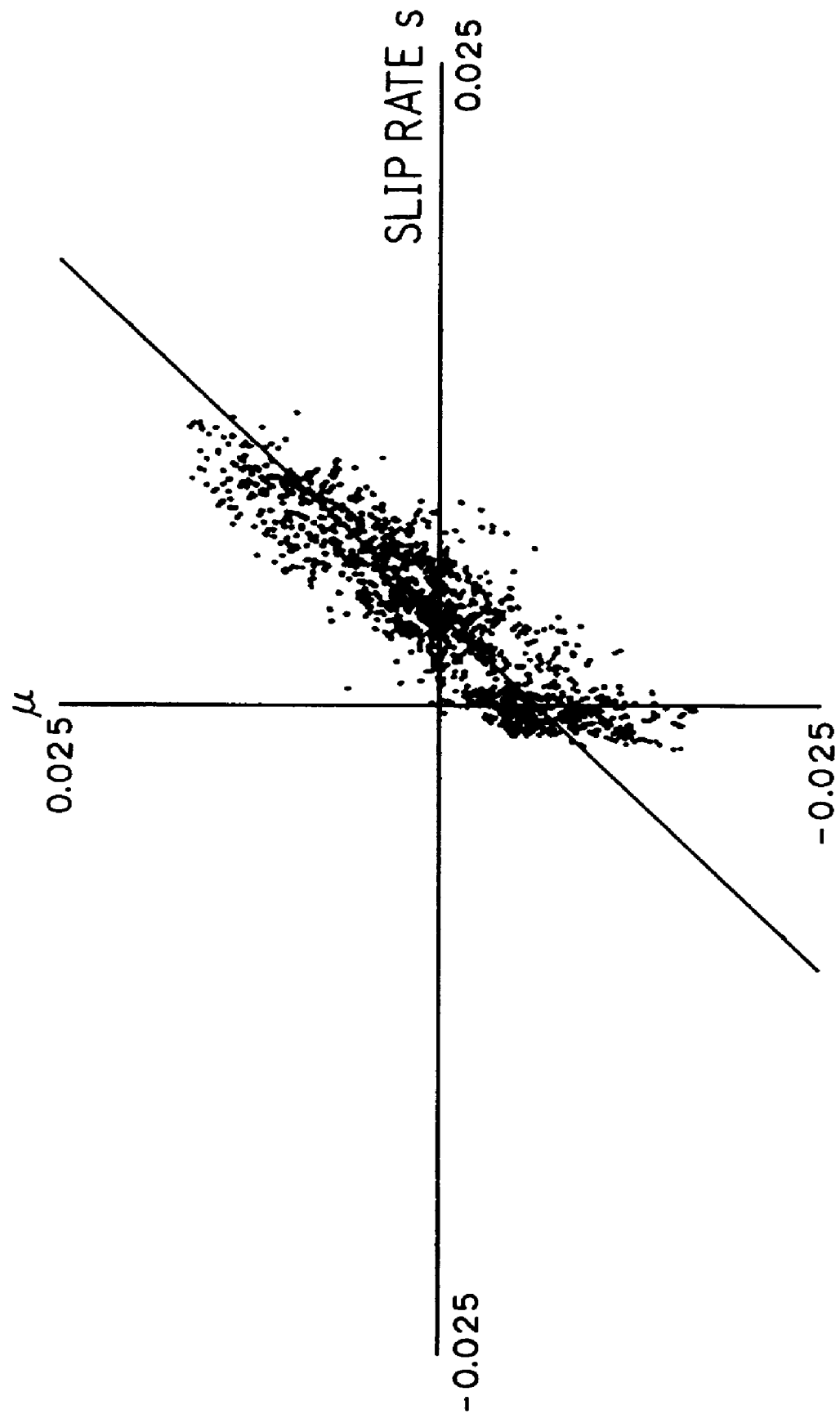

WEAR CONDITION DETECTING APPARATUS FOR TIRE AND METHOD THEREOF

BACKGROUND OF THE INVENTION

The present invention relates to a wear condition detecting apparatus for a tire and a method thereof. More particularly, the present invention relates to a wear condition detecting apparatus for a tire and a method thereof which can improve performance and safety of a vehicle by detecting a wear condition of a tire based on rotational information of the tire.

Since a tire is provided with longitudinal and vertical grooves for the sake of draining characteristics, there are formed rubber blocks that are enclosed by these grooves. A block of large size is hardly deformed by shearing in front, rear and lateral directions and presents high rigidity. A tire having a tread pattern consisting of such large sized blocks is generally called a tire of a high pattern rigidity.

The degree of pattern rigidity largely influences the slip rate besides cornering power or cornering force. Therefore, for estimating movements of a vehicle based on rotational information of a tire in a device for improving the performance or safety of the vehicle based on rotational information such as an ABS (anti-lock braking system), TCS (traction controller system), NAVI (navigation system) or a tire air-pressure drop alarming device, it is required to know the pattern rigidity of a tire. Further, wearing of a tire results in a smaller thickness of a tread rubber of the tire, whereby the rigidity in the front and rear directions becomes larger. The wearing of a tire also affects the performance of the vehicle on snow in the case of a winter tire, and affects the hydro-planing performance of the vehicle in the case of a summer tire. Therefore, while detection of wear is useful, these devices are not provided with a function of detecting wear of a tire. Wear of a tire can only be discriminated by either employing depth gauges for measuring groove depths or by confirming with eye sight a slip sign which is provided on a tire to indicate a wear limit. Such a confirmation with eye sight requires skill, whereby maintenance of a tire might be apt to be troublesome, and there also exist a danger in that wear of a tire is overlooked at the time of initial checking when performing maintenance of a tire.

The present invention has been made in view of these facts, and it is an object thereof to provide a wear condition detecting apparatus for a tire and a method thereof which regularly measures wear conditions of a tire and with which the performance and safety of a vehicle can be improved.

SUMMARY OF THE INVENTION

In accordance with the present invention, there is provided a wear condition detecting apparatus for a tire comprising:
(a) a rotational speed detecting means for regularly detecting rotational speeds of tires of four wheels presently attached to a vehicle,
(b) a calculating means for calculating a ratio of a rotational speed of a front wheel to a rotational speed of a rear wheel based on a measured value obtained by the rotational speed detecting means, and for obtaining a relational formula between the rotational speed ratio and an acceleration of the vehicle, and
(c) a comparing means for comparing a slope of the relational formula obtained by the calculating means with a preliminarily known slope of a relational formula between a rotational speed ratio of a tire and an acceleration of the vehicle.

In accordance with the present invention, there is further provided a wear condition detecting method for a tire comprising the steps of:
(a) regularly measuring rotational speeds of tires of four wheels presently attached to a vehicle,
(b) calculating a ratio of a rotational speed of a front wheel to a rotational speed of a rear wheel based on the measured rotational speed,
(c) obtaining a relational formula between the rotational speed ratio and an acceleration of the vehicle, and
(d) comparing a slope of the relational formula with a preliminarily known slope of a relational formula of a rotational speed ratio of a tire and an acceleration of the vehicle to determine a wear condition of a tire.

BRIEF EXPLANATION OF THE DRAWINGS

FIG. 8 is a diagram showing a relationship between acceleration and slip rate of a worn tire.

DETAILED DESCRIPTION

The wear condition detecting apparatus for a tire and method thereof according to the present invention will now be explained based on the accompanying drawings.

Figure 1:
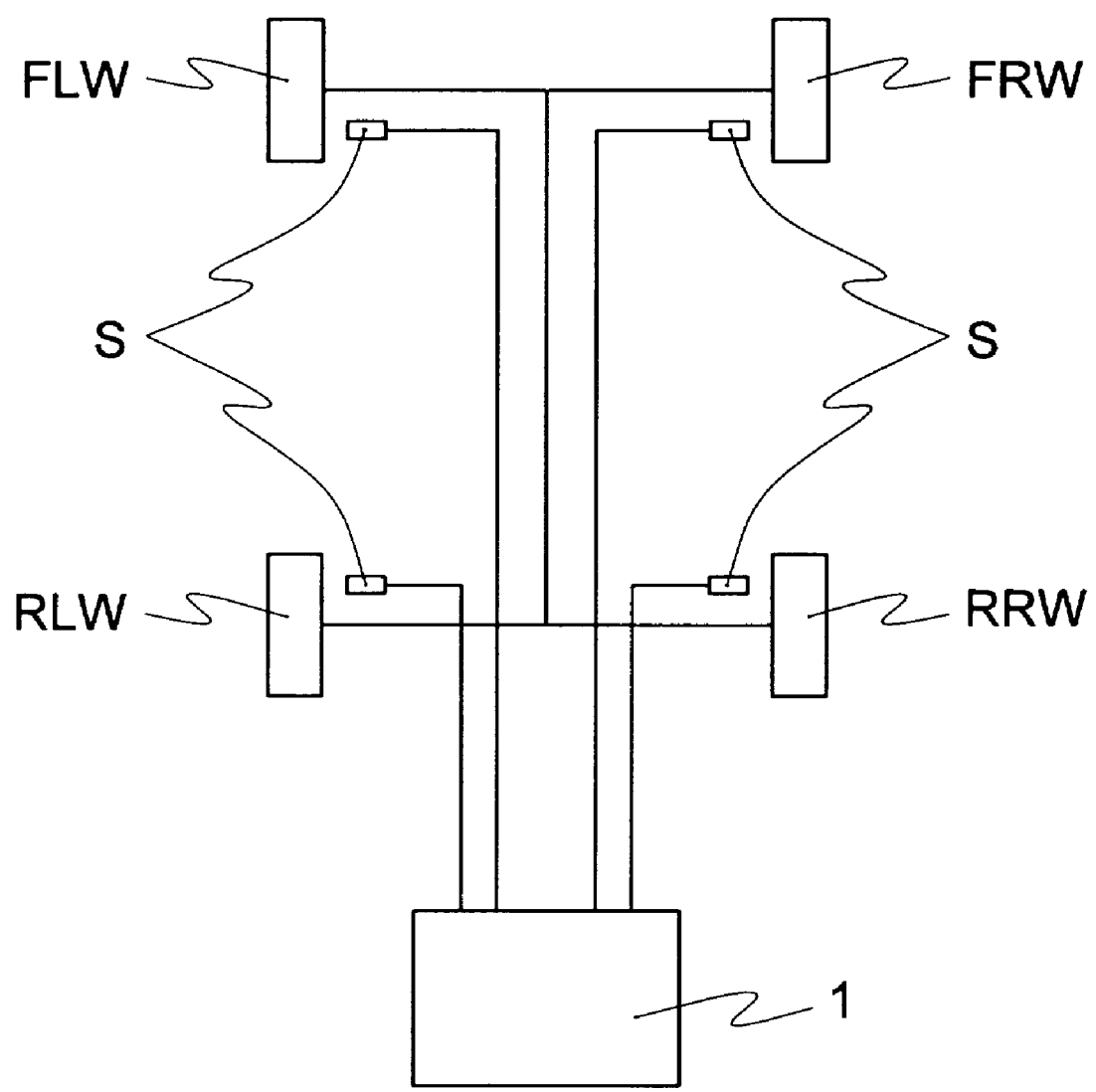
FIG. 1 is a diagram showing an arrangement of a wear condition detecting apparatus for a tire according to the present invention.
Figure 2:
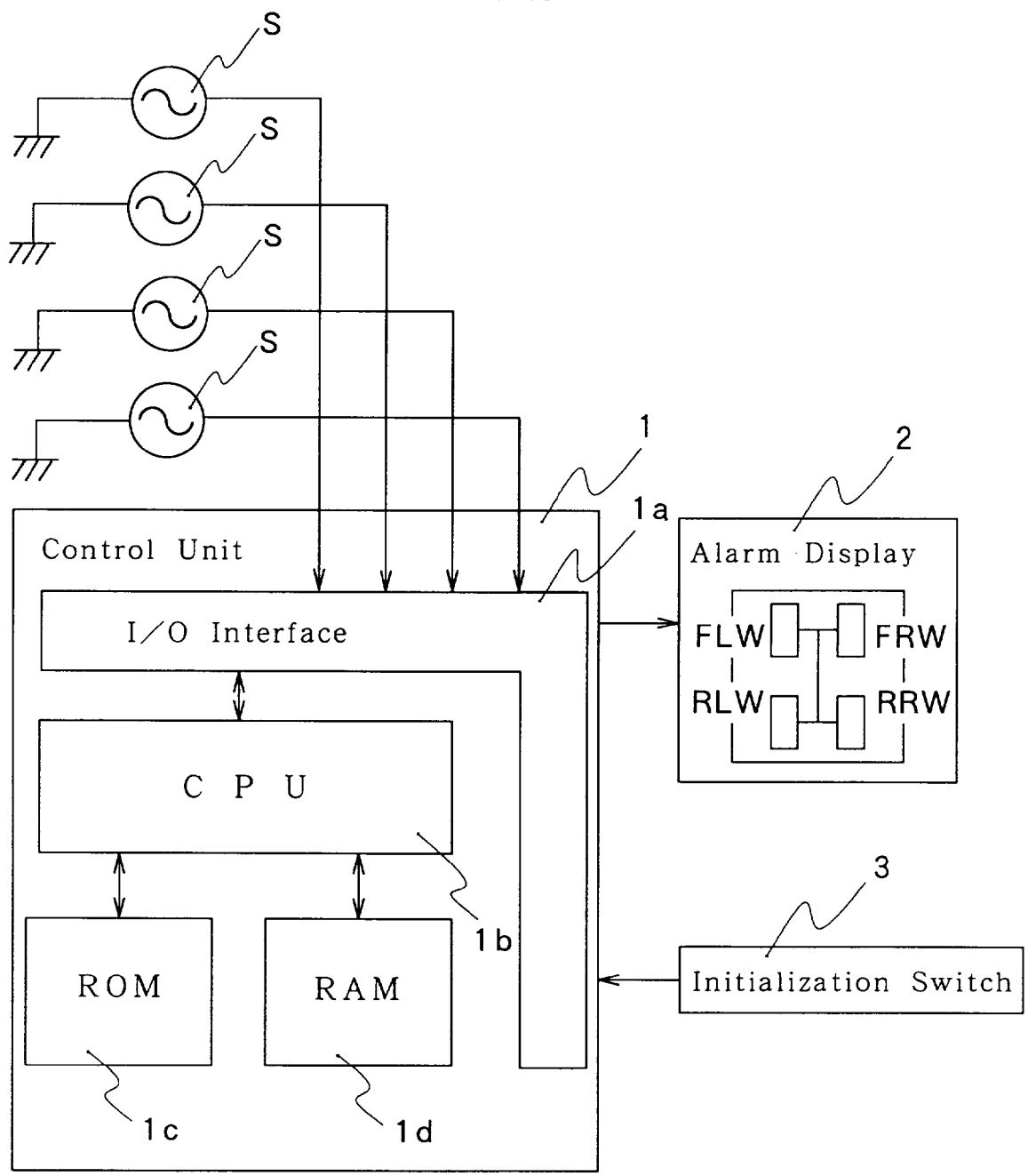
FIG. 2 is a block diagram showing an electric arrangement of the wear condition detecting apparatus for a tire of FIG. 1.

As shown in FIG. 1, the wear condition detecting apparatus includes a rotational speed detecting means S for detecting a rotational speed of a wheel tire wherein this means is provided on each tire of a four-wheeled vehicle FLW, FRW, RLW and RRW, respectively, and an output of the rotational speed detecting means S is transmitted to a control unit 1 which is, for instance, an ABS. The rotational speed detecting means S might be a wheel speed sensor which employs an electromagnetic pick-up for generating a rotational pulse wherein the rotational speed is measured based on a number of pulses, or it might alternatively be an angular speed sensor such as a dynamo in which electricity is generated by utilizing rotation and the rotational speed is measured based on a voltage thereof. As shown in FIG. 2, there is connected to the control unit 1 an alarm display device 2 comprising liquid crystal display elements, plasma display elements, CRT, lamp or sound for informing a tire of which air-pressure has dropped, and there is also connected an initializing switch 3 which can be operated by a driver or the like.

The control unit 1 comprises a calculating means for calculating a ratio of the rotational speed of the front tires FLW, FRW to the rotational speed of the rear tires RLW, RRW (front and rear wheel ratio) based on the mesurement value obtained by the rotational speed detecting means S, and for obtaining a relational formula between the front and rear wheel ratio and acceleration of the vehicle; and a comparing means for comparing a slope (gradient) of the relational formula obtained by the calculating means with a preliminarily known slope (gradient) of a relational formula between a front and rear wheel ratio and an acceleration of the vehicle. The control unit 1 is composed of an I/O interface 1a required for sending/receiving signals to/from an external device, a CPU 1b which functions as a center for performing calculation processes, a ROM 1c in which a control operation program for the CPU 1b is stored, and a RAM 1d to which data are temporally written when the CPU 1b performs control operations or from which these written data are read out.

According to present embodiment, when the comparing means has judged that a tire is in a worn condition, an alarm can be generated by the alarm display device 2. The preliminarily known tire might be, for instance, a new tire or a tire worn by 50% (intermediate-range wear) either of which is made to be a reference tire before generating alarm.

Figure 3:
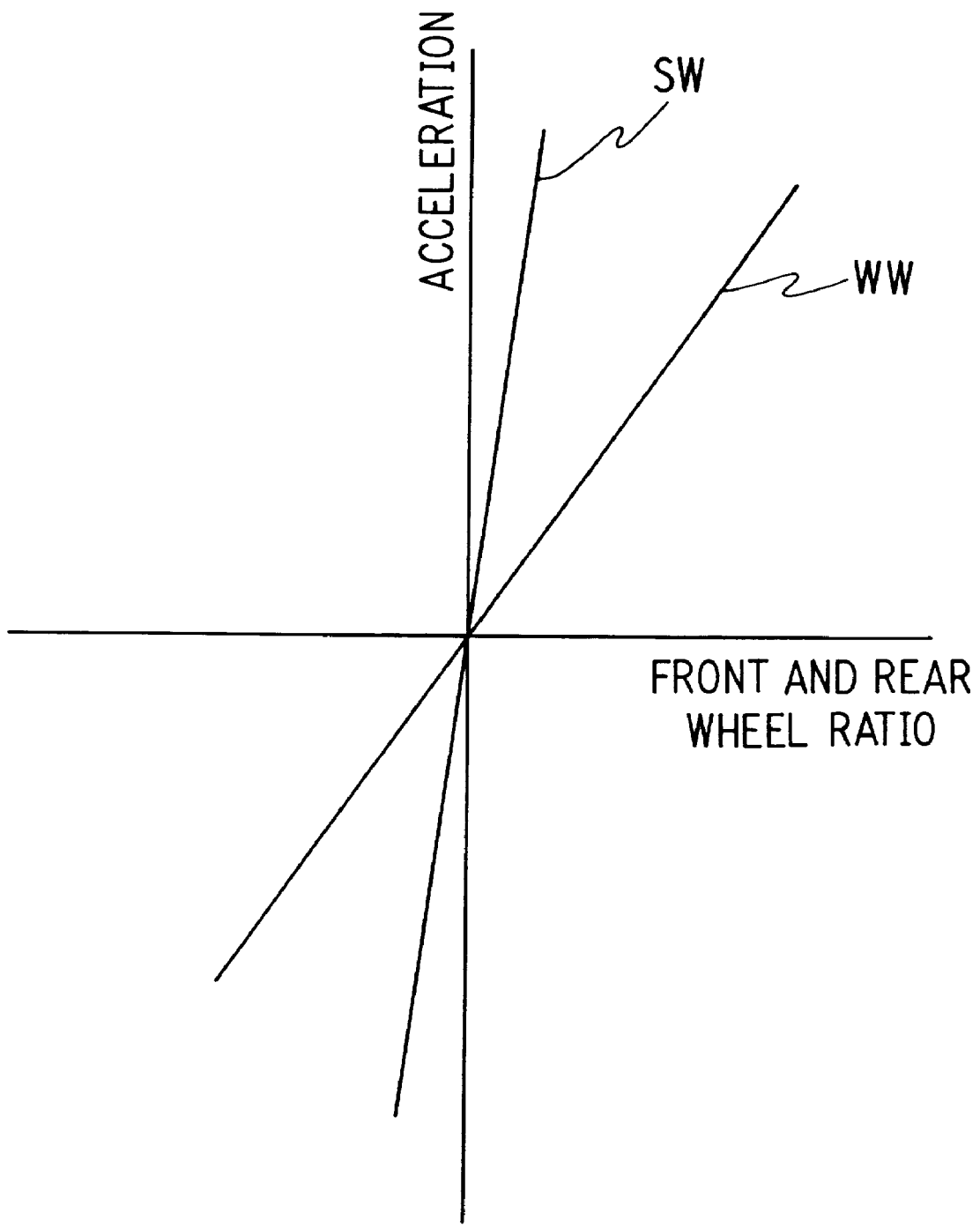
FIG. 3 is a regressive line between a front and rear wheel ratio and an acceleration for a summer tire and a winter tire.

FIG. 3 is a diagram in which the relational formula between the front and rear wheel ratio and the acceleration of the vehicle has been regressed as a linear function when a new summer tire SW and a new winter tire TW have performed straight-forward running on a flat ground surface at a velocity of 50 km/h as shown in Tables 1 and 2. It should be noted that the acceleration and the front and rear wheel ratio are obtained by the following equations ①  and ② , provided that the wheel speed data of each of the wheel tires FLW, FRW, RLW, and RRW at a specified point of time obtained from a sensor in, for example, ABS are expressed as $F1_n$, $F2_n$, $F3_n$, and $F4_n$, and the preceding wheel speed data as $F1_{n-1}$, $F2_{n-1}$, $F3_{n-1}$, and $F4_{n-1}$, respectively. $\Delta T$ denoyes a time interval of data $F1_n$ to $F4_n$ and $F1_{n-1}$ to $F4_{n-1}$.

$$\text{Acceleration} = \frac{(F1_n + F2_n + F3_n + F4_n) - (F1_{n-1} + F2_{n-1} + F3_{n-1} + F4_{n-1})}{\Delta t} \quad ①$$

$$\text{Front and Rear Wheel Ratio} = \frac{(F1_n + F2_n)}{(F3_n + F4_n)} \quad ②$$

TABLE 1

|  | New Summer Tire | Summer Tire Worn by 50% (Intermediate-Range Wear) |
| --- | --- | --- |
| Tire Size | 205/65R15 | SP65i |
| Speed (km/h) | 50 | |
| Load (kg) | 450 | |
| Ground Surface | Dry Asphalt | |

TABLE 2

|  | New Winter Tire | Winter Tire Worn by 50% (Intermediate-Range Wear) |
| --- | --- | --- |
| Tire Size | 205/65R15 | HS-1(Stud-less) |
| Speed (km/h) | 50 | |
| Load (kg) | 450 | |
| Ground Surface | Dry Asphalt | |

Figure 4:
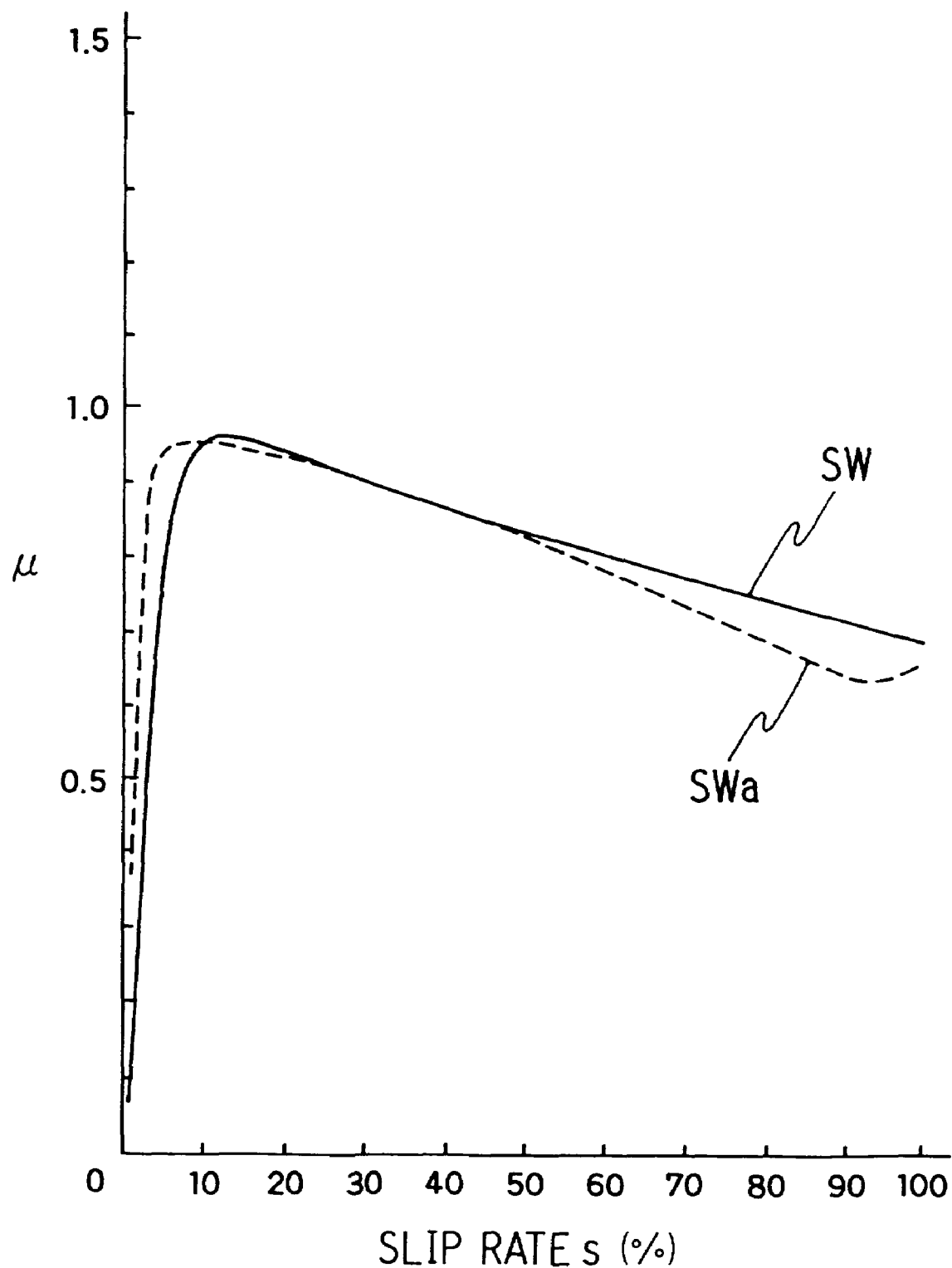
FIG. 4 is a $\mu$-s characteristics curve of the summer tire of FIG. 3.
Figure 5:
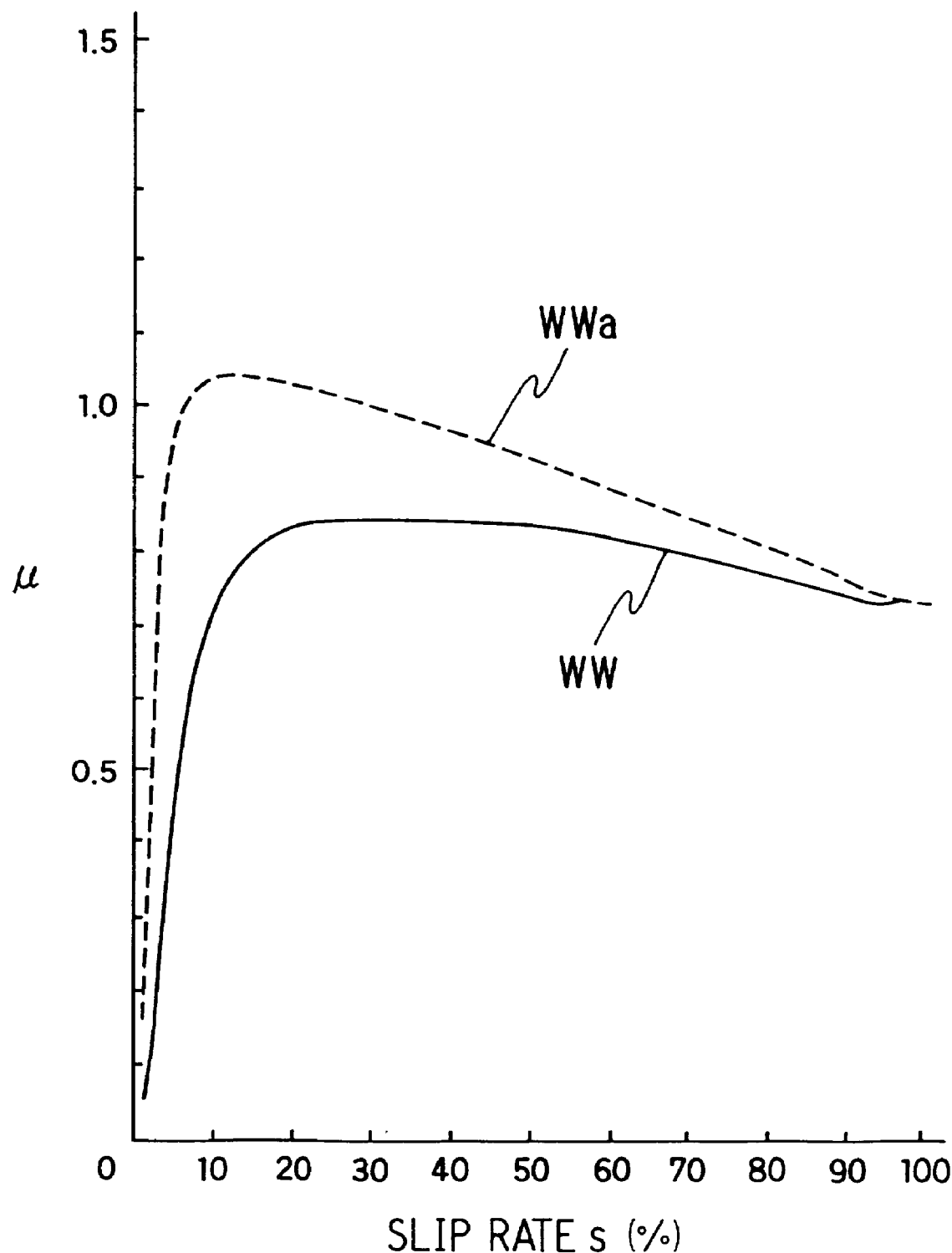
FIG. 5 is a $\mu$-s characteristics curve of the winter tire of FIG. 3.

At this point, the acceleration represents a driving force required for acceleration by being multiplied by the mass of the vehicle, and the front and rear wheel ratio represents a slip rate $\underline{s}$ by subtracting from this value a front and rear wheel ratio at the time of neutral running (which is approximately close to 1) and the relationship between these represents, so to speak, a μ-s characteristic of the tire as shown in FIGS. 4 and 5. Therefore, its slope represents the rigidity of a tire in front and rear directions.

That is, out of the μ-s characteristic of the tire, the area in which the slip rate $\underline{s}$ is small (not more than 10%), a slip hardly occurs between the tire and the ground surface, the tread rubber of the tire is deformed by shearing in front and rear directions, and force is generated in front and rear directions. This deformation by shearing is made to be the apparent slip, and the shear strength generated by the deformation by shearing is made to be the driving force or damping force, which force by being divided by load, becomes μ (damping-driving force coefficient).

The slope of μ-s characteristic curve in an area in which the slip rate $\underline{s}$ is small is determined by the rigidity of tread rubber in front and rear directions. When the pattern block of the tread is large or the rubber is hard, the rigidity of tread rubber becomes high and the slope of the μ-s characteristic curve becomes large (a rising direction), and vice versa, the slope becomes small. For instance, a stud-less tire comprises, due to its characteristics, many sipes in the pattern (i.e. the pattern block is small) and the rubber thereof is soft, the slope of the μ-s characteristic curve is smaller compared to a summer tire. When the tire is worn, the gauge of tread rubber becomes thin whereby the rigidity of tread rubber in the front and rear direction becomes larger compared to those of new tires SW, WW as shown by arrow SWa in FIG. 3 and arrow WWa in FIG. 5, and thus, the slope becomes even larger.

In the area in which the slip rate $\underline{s}$ of a tire attached to a vehicle at the time of running (e.g. a speed ratio of front and rear wheels of a 2WD) is not more than 10%, no slip is generated between the tire and the road surface, and measuring an acceleration corresponds to measurement of a driving force or control force due to deformation of tread rubber, and this force divided by load is μ. In the present embodiment, based on this fact, it has been taken notice of the fact that the slope of the μ-s characteristic curve in which the slip rate $\underline{s}$ is in the range of not more than 10% becomes large when the rigidity of the tread in the front and rear direction is large, and the slope becomes small when the rigidity thereof is small. In the case where the tire has not been exchanged, the slope of the μ-s characteristic curve measured after a specified period (the slope in which the slip rate is not more than 10%) is larger compared to a previously measured slope, this slope can be utilized for determining whether wear has occurred. For instance, based on the relational formula between the front and rear wheel ratio and the acceleration of the vehicle or based on the slope of the μ-s characteristic curve, if ma/m=k (threshold) is not less than 1.5, and preferably not less than 2.0 (wherein $\underline{m}$ represents a slope of a new tire and $\underline{ma}$ a slope of a worn tire), it is determined that this tire is worn and an alarm might be generated.

It should be noted that the wheel speed data are sampled at specified sampling periods and collected until a regression line of favorable accuracy (a relational formula between the front and rear wheel ratio and acceleration) can be obtained. This collection of data is regularly and automatically performed such as every 6 months or 1 year, or every time a run of 5,000 km or 10,000 km has been recorded, and variations in the obtained slope are evaluated.

When the slope has come into a region in which the tire is estimated to be worn, an alarm is generated. In the case of, for instance, a stud-less tire, an intermediate alarm might also be generated in an intermediate stage (a degree at which the platform can be seen) since the difference between the slope of a new tire and the slope of a completely worn tire is large. Also, since the rigidity of the tire in front and rear direction for determining an initial slope of the $\mu$-s characteristic of the tire does not largely differ between a summer tire and a winter tire in the final term of wear, it is preferable that a range of a slope in the final term of wear is preliminarily obtained for each vehicle type.

It should be noted that since initialization is generally performed when the tire is new or at the time of exchanging a tire, an alarm might be generated by watching variations in slope from this point in these cases. In order to generate an alarm in an intermediate term of wear of a winter tire, it is required to determine that this tire is actually a winter tire, determination of a winter tire is performed at the time of initialization, and an alarm in the intermediate term of wear is generated by performing regular checks.

The present invention will now be explained based on an example thereof, but the present invention is not limited to only this example.

EXAMPLE

An example for detecting a wear condition of a tire in the case of a FR vehicle will now be explained based on a tire having a tire size of 245/60R16.

An apparatus in which puncture is detected by relative comparison of wheel speed is equipped with a device for regularly detecting a wheel speed, and since such an apparatus is required to perform initialization at the time of exchanging a tire, such an apparatus will be taken as an example.

Figure 6:
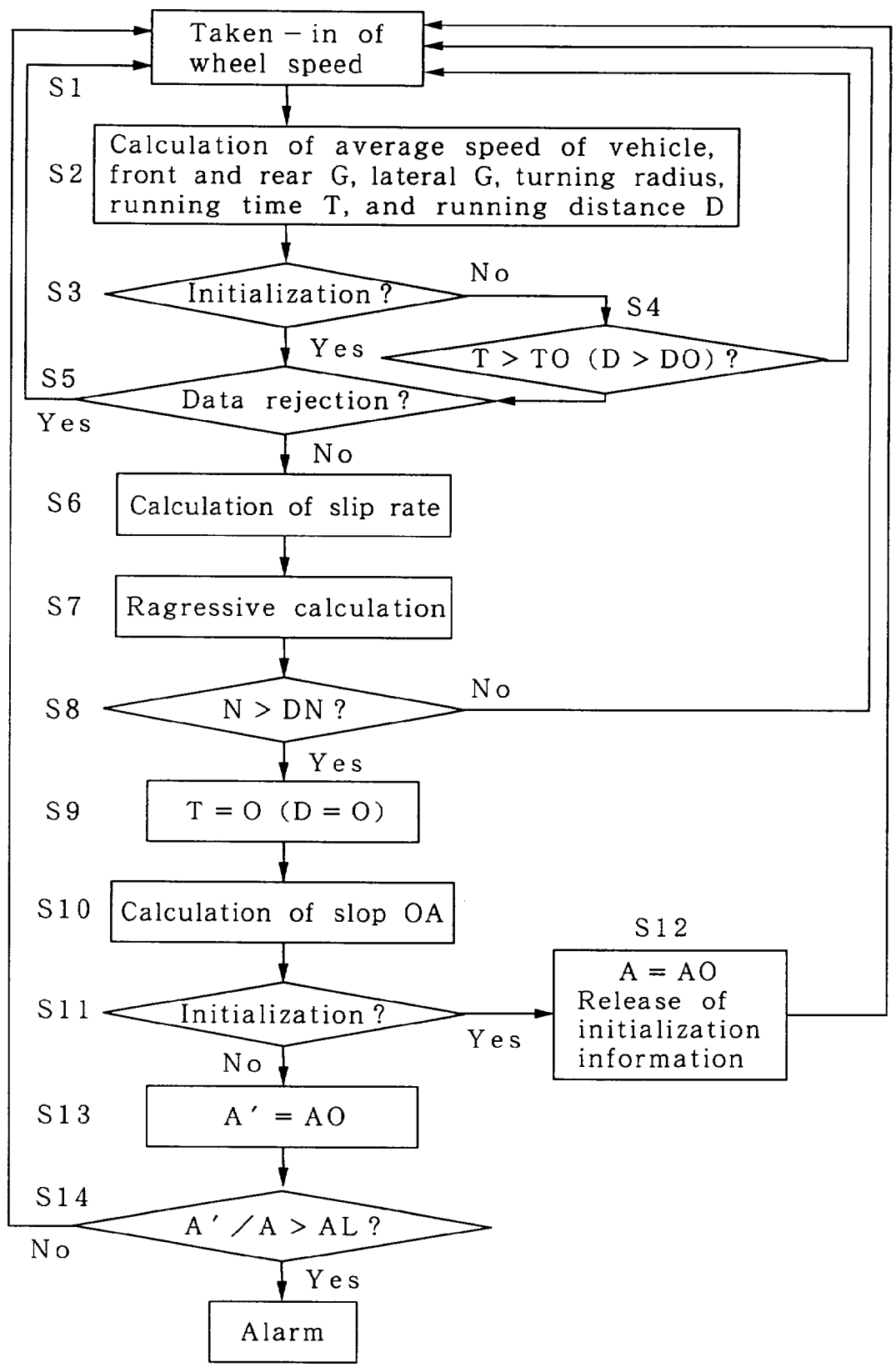
FIG. 6 is a flowchart of the present invention.
Figure 7:
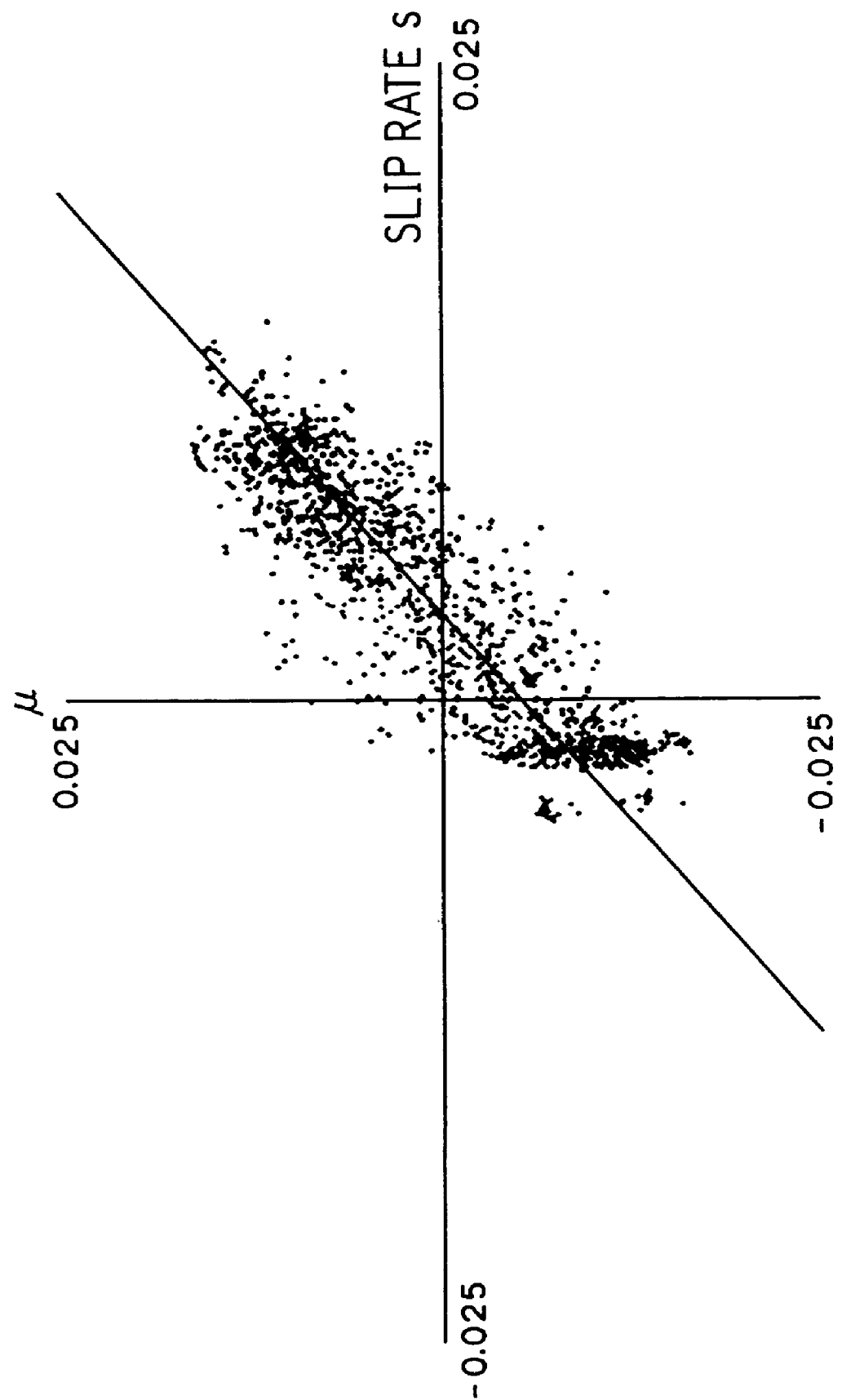
FIG. 7 is a diagram showing a relationship between acceleration and slip rate of a new tire.

First, as shown in FIG. 6, the wheel speed at the time the vehicle is running is taken in by the CPU 1b based on a wheel speed pulse output by the rotational speed detecting means S, and an average speed of the vehicle, front and rear G, lateral G and turning radius are calculated besides calculation of a running time T and a running distance D (Step S1, S2). When the initialization is performed thereafter (Step S3), the system calculates a corresponding value $\mu$ of an acceleration/deceleration speed (acceleration G) of the vehicle per second and the slip rate s (front and rear wheel ratio-1) from the wheel speed of the four wheels (Step S6) and performs regressive calculation (Step S7). At this time, it is determined whether the running time T or running distance D is identical with a preliminarily determined running time T0 or running distance D0 (Step S4). Data including many errors are eliminated (Step S5). Then, a preliminarily set number of data N are stored (Step S8). This process is repeated until a number of data DN required for the regression has been reached or exceeded whereby an initial $\mu$-s line can be obtained as shown in FIG. 7. After setting the running time T and/or running distance D to 0 (Step 9), the system performs linear regression of these data, calculates slope A and holds the same (Step S10 to S12). The slope of this example was A=1.51662. Thereafter, the system regularly repeats the above steps by referring to the running time or integrated travel distance to measure a slope A' (Step S13). In this example, A'=1.82066 as shown in FIG. 8 at a wear of approximately 30%, and A'/A=1.20. By comparing this ratio and a threshold AL, it is determined whether an alarm is generated or not (Step S14). However, when the tire has been exchanged and initialization has been performed during the measurement of the slope A', the system performs operations to obtain an initial slope A again. Then, by calculating a ratio of A to A', an alarm is generated when a specified threshold has been exceeded and it is thus determined that the tire is worn.

As explained so far, since the wear condition of a tire can be known by the present invention, the performance and safety of a vehicle can be improved.

What is claimed is:

1. A wear condition detecting apparatus for a tire comprising:
   a rotational speed detecting means for regularly detecting rotational speeds of tires of four wheels presently attached to a vehicle,
   a calculating means for calculating a ratio of a rotational speed of a front wheel to a rotational speed of a rear wheel based on a measured value obtained by the rotational speed detecting means, and for obtaining a relational formula between the rotational speed ratio and an acceleration of the vehicle, and
   a comparing means for comparing a slope of the relational formula obtained by the calculating means with a preliminarily known slope of a relational formula between a rotational speed ratio of a tire and an acceleration of the vehicle.

2. A wear condition detecting method for a tire comprising the steps of:
   regularly measuring rotational speeds of tires of four wheels presently attached to a vehicle,
   calculating a ratio of a rotational speed of a front wheel to a rotational speed of a rear wheel based on the measured rotational speed,
   obtaining a relational formula between the rotational speed ratio and an acceleration of the vehicle, and
   comparing a slope of the relational formula with a preliminarily known slope of a relational formula of a rotational speed ratio of a tire and an acceleration of the vehicle to determine a wear condition of a tire.

3. The wear condition detecting apparatus for a tire as set forth in claim 1, further comprising a display and alarm means for producing a visual or sonic alarm when at least one of said tires reaches a predetermined wear level.

4. The wear condition detecting apparatus for a tire as set forth in claim 3, wherein said visual or sonic alarm is initiated when it is determined at least one of said tires is found to be at an intermediate term of wear.

5. The wear condition detecting apparatus for a tire as set forth in claim 1, wherein said acceleration is calculated using a ratio of a difference of a current wheel speed or a sum of a plurality of current wheel speeds and a previous wheel speed or a sum of a plurality of previous wheel speeds to a determined time interval.

6. A wear condition detecting method for a tire as set forth in claim 2, comprising calculating said acceleration using a ratio of a difference of current wheel speed or a sum of a plurality of current wheel speeds and a previous wheel speed or a sum of a plurality of previous wheel speeds to a determined time interval.

7. The wear condition detecting apparatus for a tire as set forth in claim 1, wherein the apparatus determines whether or not at least one of said tires is worn based upon a regression slope of said relational formula.

8. A wear condition detecting method for a tire as set forth in claim 2, comprising determining whether or not at least one of said tires is worn based upon a regression slope of said relational formula.

* * * * *